United States Patent
Dikshtein et al.

(10) Patent No.: US 11,099,268 B2
(45) Date of Patent: Aug. 24, 2021

(54) DOPPLER AMBIGUITY RESOLUTION VIA HIGH ORDER PHASE TERMS

(71) Applicant: GM GLOBAL TECHNOLOGY OPERATIONS LLC, Detroit, MI (US)

(72) Inventors: Michael Dikshtein, Haifa (IL); Igal Bilik, Rehovot (IL); Shahar Villeval, Tel Aviv (IL); Oren Longman, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 327 days.

(21) Appl. No.: 16/225,784

(22) Filed: Dec. 19, 2018

(65) Prior Publication Data

US 2020/0200889 A1   Jun. 25, 2020

(51) Int. Cl.
  *G01S 13/32* (2006.01)
  *G01S 13/58* (2006.01)
  *G01S 7/282* (2006.01)
  *G01S 7/292* (2006.01)

(52) U.S. Cl.
  CPC ............ *G01S 13/582* (2013.01); *G01S 7/282* (2013.01); *G01S 7/292* (2013.01)

(58) Field of Classification Search
  CPC .......... G01S 13/582; G01S 7/282; G01S 7/292
  See application file for complete search history.

(56) References Cited

U.S. PATENT DOCUMENTS

| | | | |
|---|---|---|---|
| 2013/0301391 A1* | 11/2013 | Altman | G01S 15/003 367/100 |
| 2016/0103214 A1* | 4/2016 | Clark | G01S 13/723 342/59 |
| 2018/0329031 A1* | 11/2018 | Cheung | G01S 7/40 |
| 2019/0129026 A1* | 5/2019 | Sumi | G01S 15/8997 |
| 2019/0265346 A1* | 8/2019 | Hakobyan | G01S 13/931 |
| 2020/0090366 A1* | 3/2020 | Korjus | G06T 7/73 |

* cited by examiner

*Primary Examiner* — Timothy A Brainard
(74) *Attorney, Agent, or Firm* — Cantor Colburn LLP

(57) ABSTRACT

A vehicle, radar system for the vehicle and method of operating the vehicle is disclosed. The radar system includes a transmitter, a receiver and a processor. The transmitter transmits a source signal into a region proximate the vehicle. The receiver receives a reflected signal formed by reflection of the source signal from an object in the region. The processor obtains non-linear terms of a phase from the reflected signal and resolves a Doppler ambiguity of the object using the non-linear terms. A navigation system navigates the vehicle with respect to the object based on the resolved Doppler ambiguity.

17 Claims, 5 Drawing Sheets

Velocity [m/s]

DOPPLER AMBIGUITY RESOLUTION VIA HIGH ORDER PHASE TERMS

INTRODUCTION

The subject disclosure relates to resolving Doppler ambiguity in radar signals and, in particular, to a system and method for reducing Doppler ambiguity using higher-order terms of a phase of a reflected signal.

Radar systems have upper limits on their detection ranges above which a measurement can be ambiguous. In particular, radar systems include a measurement limit for the maximum unambiguous radial velocity that can be measured using the radar system. This limit results from the Nyquist frequency or the chirp rate of the radar system. Accordingly, it is desirable to provide a system and method for reducing Doppler ambiguity in vehicular radar systems.

SUMMARY

In one exemplary embodiment, a method of operating a vehicle is disclosed. A source signal is transmitted into a region proximate a vehicle. A reflected signal due to a reflection of the source signal from an object in the region is received. Non-linear terms of a phase from the reflected signal are obtained. A Doppler ambiguity of the object is resolved using the non-linear terms.

In addition to one or more of the features described herein, the method includes obtaining a product of the reflected signal and the source signal, performing a low pass filter on the product, and sampling the filtered signal to obtain a sampled signal having the phase with non-linear terms. The non-linear terms are non-linear in at least one of a chirp index, a sample index, and a combination of the chirp index and the sample index. The method includes determining a likelihood function from the non-linear phase. The likelihood function can be determined for each of a plurality of velocity hypotheses determined from Doppler frequency peaks, and the velocity hypothesis for which the likelihood function has a global maximum value is selected. The global maximum value of the likelihood function is located by searching along one of a range and a velocity dimension of a likelihood grid during a first one-dimensional search and searching along the other of the range and velocity dimension during a second one-dimensional search. The method includes navigating the vehicle with respect to the object based on the resolved Doppler ambiguity.

In another exemplary embodiment, a radar system for a vehicle is disclosed. The radar system includes a transmitter, a receiver and a processor. The transmitter is configured to transmit a source signal into a region proximate the vehicle. The receiver is receptive to a reflected signal formed by reflection of the source signal from an object in the region. The processor is configured to obtain non-linear terms of a phase from the reflected signal, and resolve a Doppler ambiguity of the object using the non-linear terms.

In addition to one or more of the features described herein, the processor is further configured to obtain a product of the reflected signal and the source signal, perform a low pass filter on the product, and sample the filtered signal to obtain a sampled signal having the phase with non-linear terms. The non-linear terms are non-linear in at least one of a chirp index, a sample index, and a combination of the chirp index and the sample index. The processor is further configured to determine a likelihood function from the non-linear phase. The processor is further configured to determine a likelihood function for each of a plurality of velocity hypotheses determined from Doppler frequency peaks, and select the velocity hypothesis for which the likelihood function has a global maximum value. The processor is further configured to locate the global maximum value of the likelihood function by searching along one of a range and a velocity dimension of a likelihood grid during a first one-dimensional search and searching along the other of the range and velocity dimension during a second one-dimensional search. The processor is further configured to navigate the vehicle with respect to the object based on the resolved Doppler ambiguity.

In yet another exemplary embodiment, a vehicle is disclosed. The vehicle includes a transmitter, a receiver, a processor and a navigation system. The transmitter is configured to transmit a source signal into a region proximate a vehicle. The receiver is receptive to a reflected signal formed by reflection of the source signal from an object in the region. The processor is configured to obtain non-linear terms of a phase from the reflected signal, and resolve a Doppler ambiguity of the object using the non-linear. The navigation system is configured to navigate the vehicle with respect to the object based on the resolved Doppler ambiguity.

In addition to one or more of the features described herein, the processor is further configured to obtain a product of the reflected signal and the source signal, perform a low pass filter on the product, and sample the filtered signal to obtain a sampled signal having the phase with non-linear terms. The non-linear terms are non-linear in at least one of a chirp index, a sample index, and a combination of the chirp index and the sample index. The processor is further configured to determine a likelihood function from the non-linear phase. The processor is further configured to determine a likelihood function for each of a plurality of velocity hypotheses determined from Doppler frequency peaks, and select the velocity hypothesis for which the likelihood function has a global maximum value. The processor is further configured to locate the global maximum value of the likelihood function by searching along one of a range and a velocity dimension of a likelihood grid during a first one-dimensional search and searching along the other of the range and velocity dimension during a second one-dimensional search.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
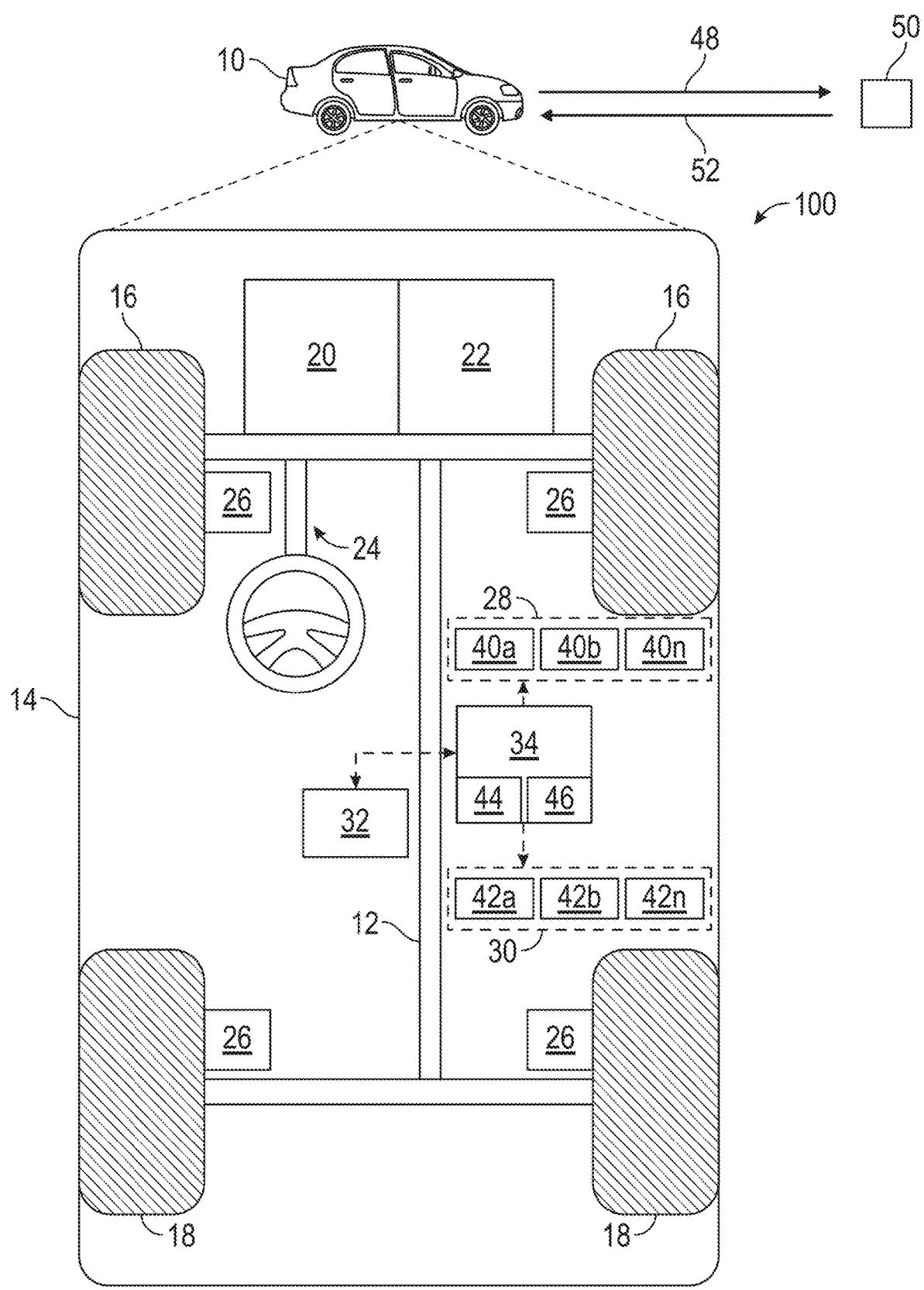
FIG. 1 shows a vehicle with an associated trajectory planning system in accordance with various embodiments.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10 with an associated trajectory planning system depicted at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32 and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. In various embodiments, the vehicle 10 includes a radar system including an array of radar sensors, the radar sensors of the radar array being located at various locations along the vehicle 10. A radar sensor can include a transmitter and a receiver, in various embodiments. In operation, a radar sensor sends out an electromagnetic source pulse 48 or electromagnetic source signal that is reflected back at the vehicle 10, in the form of a reflected pulse 52 or reflected signal, by one or more objects 50 in the field of view of the sensor. The source pulse 48 can be a linear frequency modulated (LFM) pulse or "chirp" pulse. Reflected pulse 52 can be used to determine range, Doppler and direction of arrival measurements of the one or more objects 50. These measurements can having a Doppler ambiguity due to motion of the object 50 and upper chirp rate frequency limits of the radar system. The radar system disclosed herein provides a process for resolving the Doppler ambiguity, allowing for a true measurement of a velocity of the object 50, so that the vehicle 10 can be navigated with respect to the object 50. These methods are discussed below.

The actuator system 30 includes one or more actuator devices 42a-42n that control one or more vehicle features such as, but not limited to, the propulsion system 20, the transmission system 22, the steering system 24, and the brake system 26. In various embodiments, the features of the vehicle 10 can further include interior and/or exterior features such as, but are not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The trajectory planning system 100 navigates the autonomous vehicle 10 based on a determination of objects and/ their locations within the environment of the vehicle. In various embodiments, the controller 34 operates a plurality of radars at various locations on the vehicle 10 to determine a parameter (i.e., range, elevation and azimuth, Doppler frequency) of the object 50 using a plurality of chirp signals. Upon determining various parameters of the object, the controller 34 can operate the one or more actuator devices 42a-42n, the propulsion system 20, transmission system 22, steering system 24 and/or brake 26 in order to navigate the vehicle 10 with respect to the object 50.

The radar system can determine a radial velocity of an object up to a limit referred to as a maximal unambiguous radial velocity. The limit is a result of the chirp rate of the radar system. The maximal unambiguous radial velocity $V_{max}$ is a function of an operating wavelength $\lambda_0$ of the radar system by the Eq. (1):

$$V_{max} = \frac{\lambda_0}{4T} \qquad \text{Eq. (1)}$$

where T is the length of the source pulse or pulse repetition interval. A range resolution $\Delta R$ can be expressed as in Eq. (2):

$$\Delta R = \frac{c}{2\alpha T} \qquad \text{Eq. (2)}$$

where $\alpha$ is a chirp slope and T is a pulse repetition interval, and c is the speed of light. The maximum range $R_{max}$ is given by Eq. (3):

$$R_{max} = \frac{f_s}{\alpha}\frac{c}{2} \qquad \text{Eq. (3)}$$

where $f_s$ is a sampling frequency.

The time delay from a radar transmitter or radar system to an object can be described as:

$$\tau(t)=t_0+\gamma t \qquad \text{Eq. (4)}$$

where the first term is a delay due to the distance to the object and the second term is delay resulting from the (radial) velocity of the object. The first term of Eq. (4) is given by:

$$t_0 = \frac{2r_0}{c} \qquad \text{Eq. (5)}$$

where $r_0$ is a range or distance to the object and c is the speed of light. Furthermore, $$\gamma \triangleq \frac{2v}{c} \qquad \text{Eq. (6)}$$

where v is the velocity of the object.

The source signal $s_t(t)$ that is transmitted by the radar system is a chirp signal that sweeps across the frequency bandwidth. In general, the source signal includes a plurality of chirp signals. The source signal can thus be described as shown in Eqs. (4) and (5):

$$s_t(t)=a_t\Sigma_{k=0}^{N_s-1}u(t-kT-T_1) \qquad \text{Eq. (7)}$$

where $a_t$ is an amplitude of the source signal, $N_s$ is the number of chirp signals in a test frame, k is a chirp index indicating the order of the chirp signal and $T_1$ is an idle time interval between chirps. An individual chirp has the waveform of:

$$u(t) = \begin{cases} \exp\left(-j2\pi\left(f_0 t + \frac{1}{2}\alpha t^2\right)\right) & 0 \le t \le T_{pw} \\ 0 & \text{otherwise} \end{cases} \qquad \text{Eq. (8)}$$

where $f_0$ is a carrier frequency of the source signal and a is a chirp slope of the source signal.

The source signal is generated at the transmitter and reflected off of an object to create a reflected signal. The reflected signal is received at the radar system. Once the reflected signal is received at the radar system, the reflected signal is multiplied with the source signal to obtain a product of the reflected signal and the source signal. The product is then filtered using, for example, a low pass filter. The filtered signal is then sampled in order to generate a digital signal that can be processed to determine the various parameters of the object such as its range and Doppler frequency.

Figure 2:
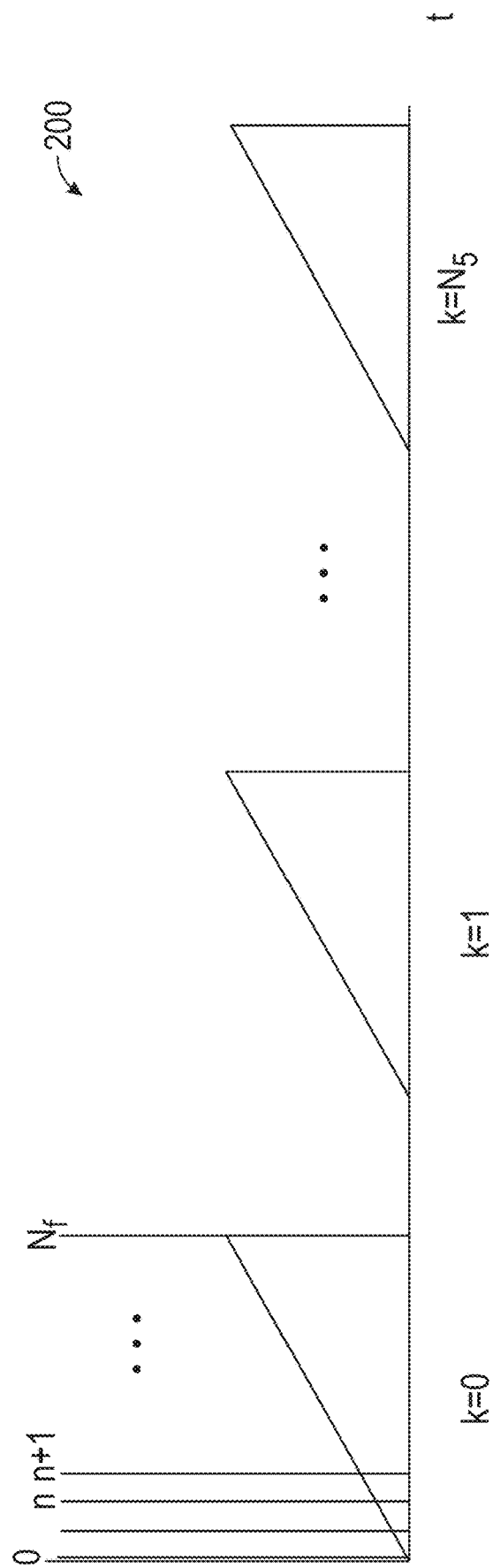
FIG. 2 shows an exemplary chirp pulse train that is used to obtain parameters such as range and Doppler frequency.

FIG. 2 shows an exemplary chirp pulse train 200 that is used to obtain parameters such as range and Doppler frequency. The chirp pulse train includes Ns chirp pulses, with each chirp pulse being labelled by its chirp index k. A plurality of sampling intervals are shown with respect to the first chirp pulse (k=0). There are $N_f$ sampling intervals, with each sampling interval labelled by its sample index n. It is to be understood that similar sampling intervals, though not shown explicitly, are also applied to the other chirp pulses.

Given the waveform of Eqs. (7) an (8), the phase of the sampled signal is described by Eq. (9):

$$\phi[n,k] \approx \phi_0 - 2\pi((\alpha t_0 + \gamma f_0)T_s n + \gamma f_0 T_c k + \alpha \gamma T_s^2 n^2 + \alpha \gamma T_c T_s nk) \qquad \text{Eq. (9)}$$

where the term $T_s$ is the duration of a sampling period, $T_c$ is a chirp period duration, n is an samples index and k is an index of the chirp signal. The term $f_0$ is the carrier frequency and $\gamma$ is given by Eq. (6). The phase of Eq. (9) includes terms that are linear in terms of n and k (i.e., $(\alpha t_0+\gamma f_0)T_s n$ and $\gamma f_0 T_c k$) as well as non-linear in terms of n and k (i.e., $\alpha\gamma T_s^2 n^2$ and $\alpha\gamma T_c T_s nk$), with each term providing information on the range and speed of the object.

Figure 3:
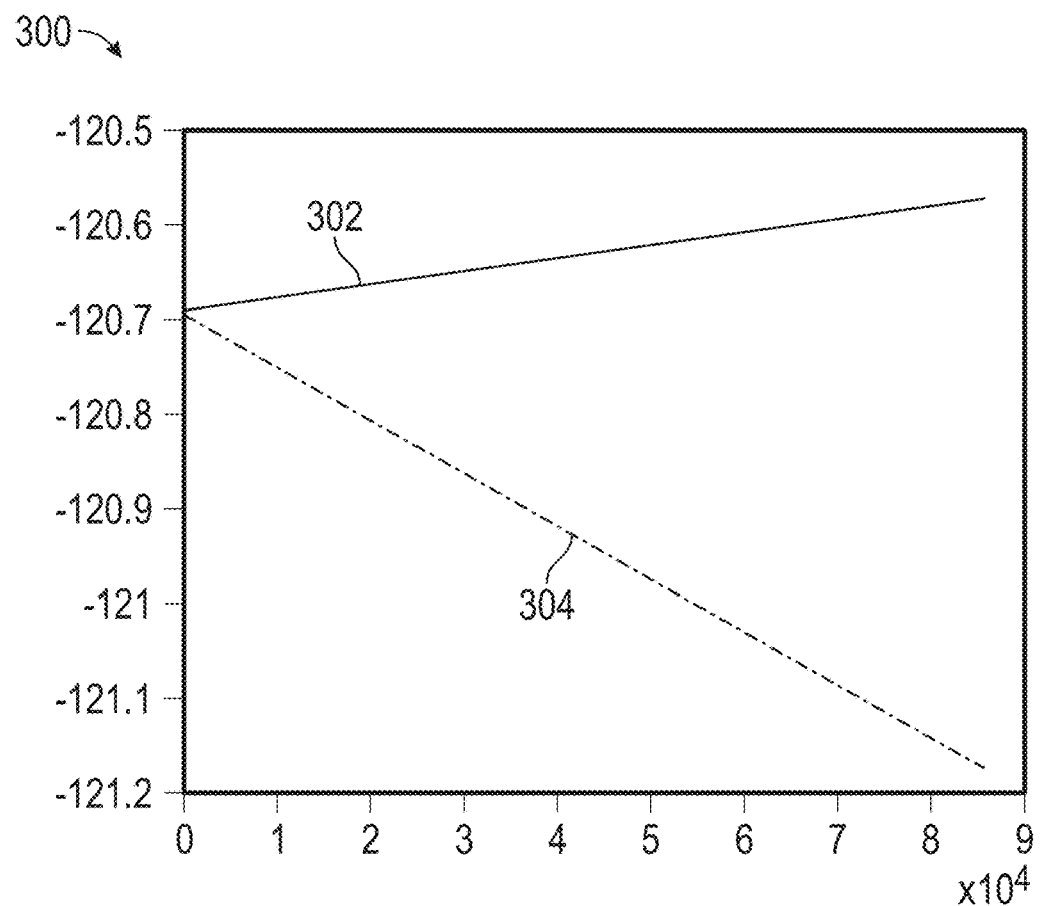
FIG. 3 shows a graph illustrating the effects of non-linear terms on a phase of a sampled signal.

FIG. 3 shows a graph 300 illustrating the effects of the non-linear terms on the phase of Eq. (9). A sample number n is shown along the abscissa and a phase difference $\Delta\varphi$ is shown along ordinate axis. A first curve 302 shows the effect of sample number on the phase difference for an object having a velocity of −18.66 meters/second (m/s). The second curve 304 is a phase difference that is recorded due to aliasing of the Doppler frequency of the object, thereby yielding, through aliasing, a faulty velocity of 75 m/s. The difference or separation between the first curve 302 and the second curve 304, which grows with sample number n, is due to the occurrence of the terms of the phase in Eq. (9) that are non-linear in n and k. The aliased signal can be identified and removed using the methods disclosed below.

For an object located at a distance $r_0$ and moving with a velocity v, the sampled signal, based on the phase of Eq. (9), can be expressed as:

$$y[n,k]=b_0 \exp(j\phi_0)\exp(j2\pi(\alpha t_0+\gamma f_0)T_s n)\exp(j2\pi\alpha\gamma T_s^2 n^2)\exp(j2\pi\gamma f_0 T_c k)\exp(j2\pi\alpha\gamma T_c T_s nk)+z[n,k] \qquad \text{Eq. (10)}$$

where z[n,k] is an additive circularly symmetric complex Gaussian noise term.

A local likelihood function can be determined from the received signal as $$L[t_0\gamma]=\Sigma_{k=0}^{N_s-1}\Sigma_{n=0}^{N_f-1} y[n,k]\exp(-j2\pi(\alpha t_0+\gamma f_0)T_s n)\exp(-j2\pi\alpha\gamma T_s^2 n^2)\exp(-j2\pi\gamma f_0 T_c k)\exp(-j2\pi\alpha\gamma T_c T_s nk)+z[n,k] \qquad (11)$$

The likelihood function for a plurality of possible Doppler peaks that result from processing of the reflected signal. A maximal value of the likelihood function can be determined for each evaluated Doppler peak, with the likelihood function having the greatest maximal value being representative of the Doppler peak representative of the velocity of the object.

Figure 4:
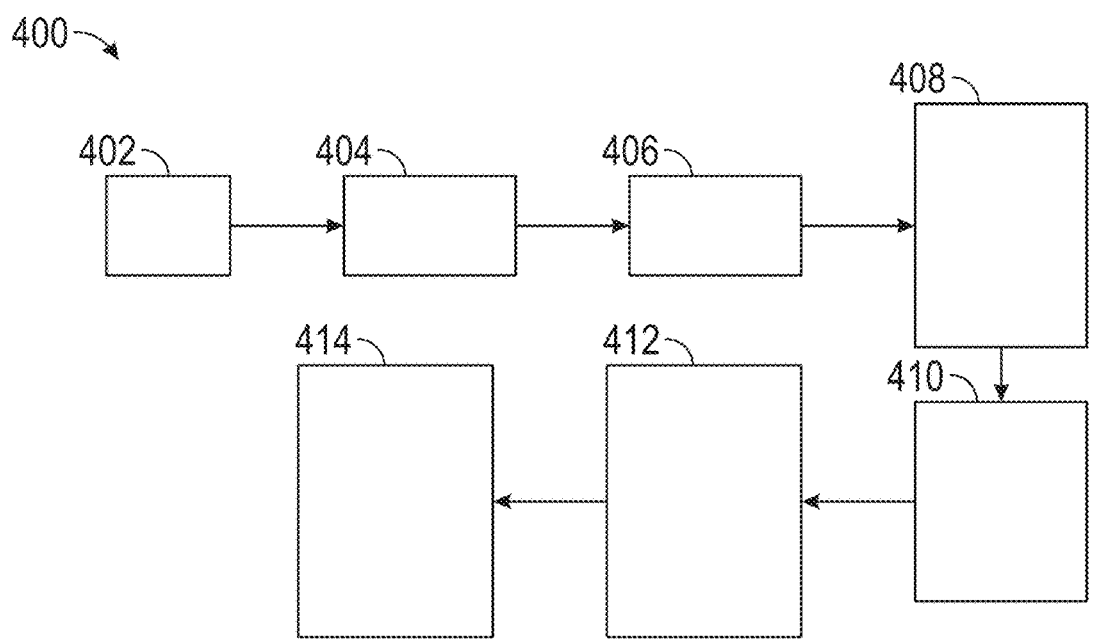
FIG. 4 shows a schematic flowchart illustrating a method for resolving a Doppler ambiguity in a radar signal.

FIG. 4 shows a schematic flowchart 400 illustrating a method for resolving a Doppler ambiguity in a radar signal. In box 402, a sampled signal y[n,k] is received. In box 404, a range transform (Range FFT) is performed on the signal y[n,k] in order to determine a range of the object. In box 406, a Doppler FFT is performed on the signal y[n,k] in order to determine one or more possible velocities, referred to as a "velocity hypothesis" for the object. A velocity hypothesis can be a Doppler frequency in the Doppler FFT at which a peak occurs or at which a peak exceeds a threshold value. In box 408, for a velocity hypotheses, the range frequency $F_b$ and the Doppler frequencies $F_D$ are extracted from a range-Doppler map. In box 410, for each velocity hypothesis, a likelihood function is calculated on a local grid. In box 412, a maximum value is determined for each likelihood function. In box 414, the hypothesis corresponding to the likelihood function having the highest maximum value is selected as the velocity hypothesis to represent the object.

Figure 5A:
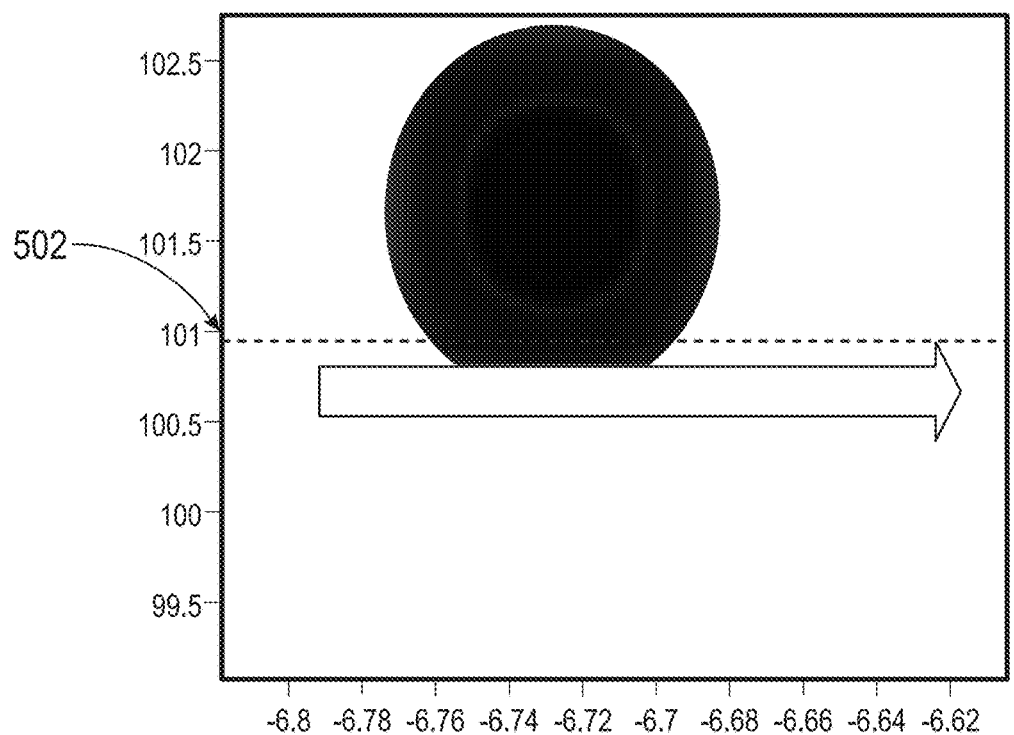
FIGS. 5A and 5B illustrate a method of searching a likelihood grid for a maximum value of a likelihood function.
Figure 5B:
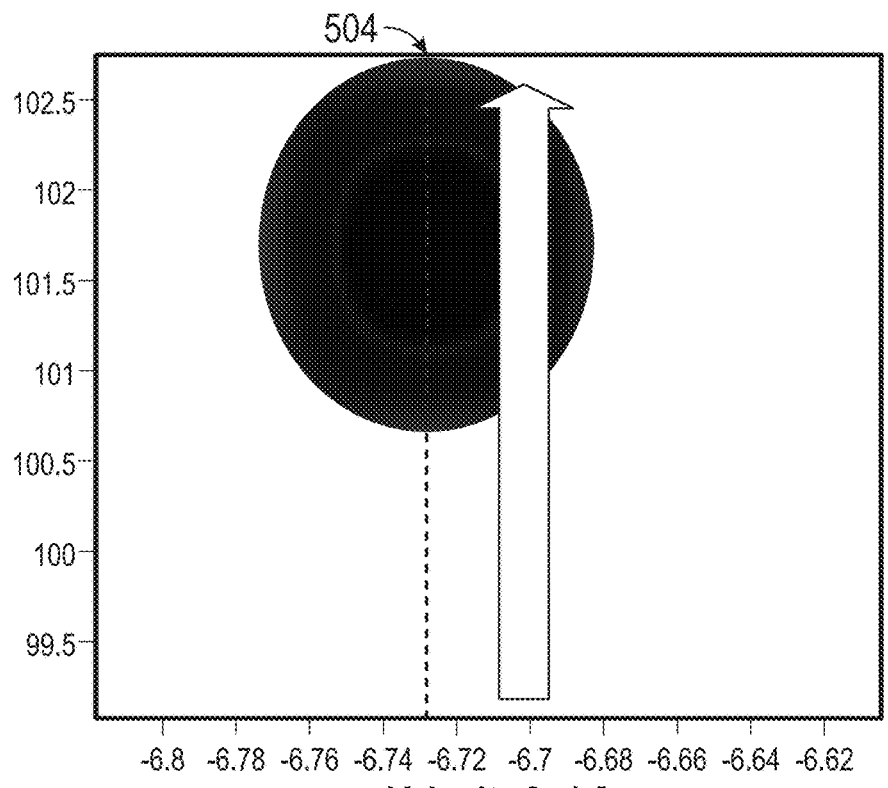

FIGS. 5A and 5B illustrate a method of searching a likelihood grid for a maximum value of a likelihood function. The local likelihood grid can be changed in order to reduce a number of points for which the processing takes place. A two-dimensional search over the local likelihood grid can be replaced with two successive one-dimensional searches. As shown in FIG. 5A, a range value 502 can be selected and the value of the likelihood function can be measured during a one-dimensional search across the velocity. Once a maximum value of the likelihood function is determined for the one-dimensional search across the velocity, the velocity 504 at which the maximum value occurs can be used to establish a second one-dimensional search. As shown in FIG. 5B, a selected velocity 504 determined from the one-dimensional search along the velocity, as shown in FIG. 5A, is used and the value of the likelihood function measured during a one-dimensional search across the range. Using this process, the velocity and range at which the likelihood function reaches a maximum can be determined.

Additionally, the maximum value (i.e., value at the peak of the likelihood function) can be measured at the determined velocity and range.

Figure 6:
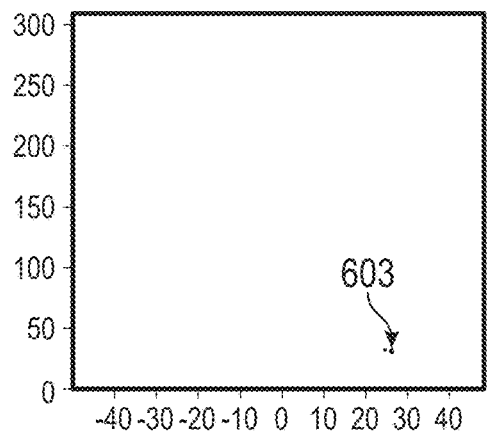
FIG. 6 shows various graphs illustrating the operation of the methods disclosed herein to resolve a Doppler ambiguity of a radar system.
Figure 6:
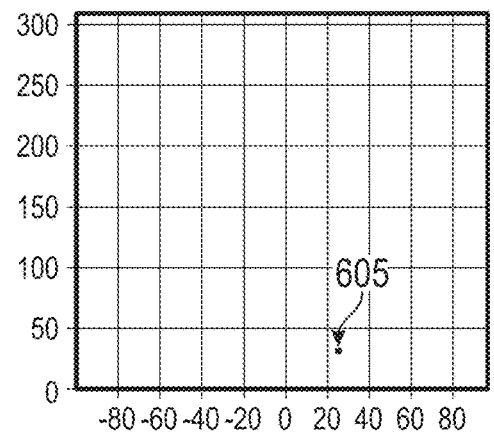
Figure 6:
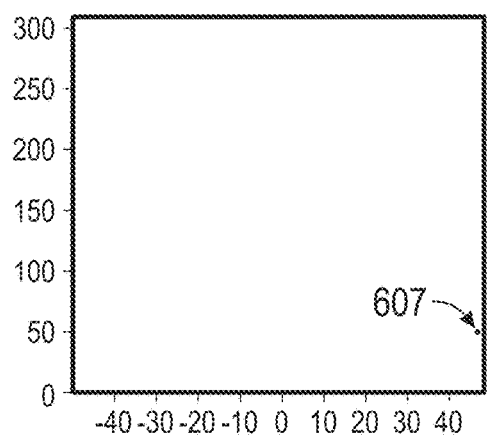
Figure 6:
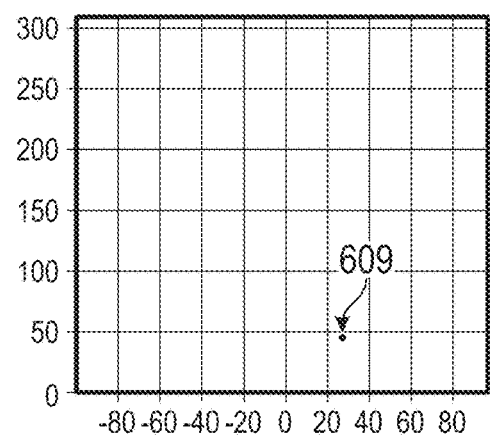
Figure 6:
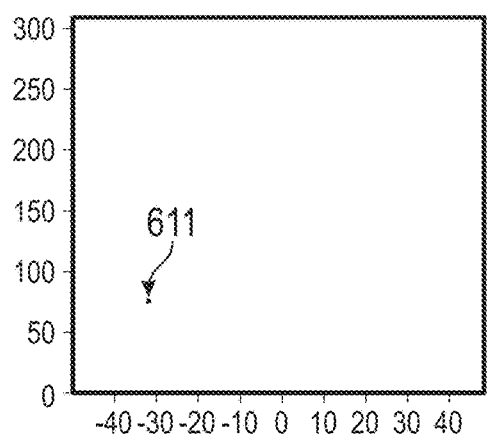
Figure 6:
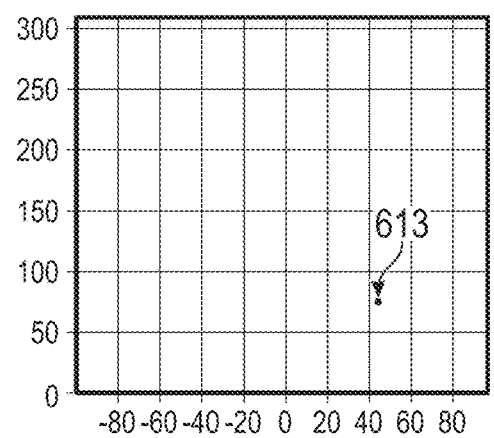

FIG. 6 shows various graphs illustrating the operation of the methods disclosed herein to resolve a Doppler ambiguity of a radar system. A first graph 602 is a range-Doppler graph showing a detection 603 of an object with a velocity of about 25 kilometers per hour (kph). The accompanying Doppler-resolved graph 604 shows a detection 605 at a velocity of about 25 kph. Similarly, a second graph 606 is a range-Doppler graph showing a detection 607 of an object with a velocity of about 42 kph. The accompanying Doppler-resolved graph 608 shows a detection 609 at a velocity of about 42 kph. Finally, a third graph 610 is a range-Doppler graph showing a detection 611 of an object with a velocity of about −30 kph. The accompanying Doppler-resolved graph 612 shows that the detection 613 actually occurs at a velocity of about 62 kph. Thus, the aliased signal that occurs in the range-Doppler graph 610 as the velocity of the object exceeds the maximal unambiguous velocity is corrected in the Doppler-resolved graph 612.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
transmitting a source signal into a region proximate a vehicle;
receiving a reflected signal due to a reflection of the source signal from an object in the region;
sampling the reflected signal at a sampling interval to obtain a plurality of velocity hypotheses, each velocity hypothesis having a phase that is non-linear in at least a sample index of the sampling interval;
determining a likelihood function for the plurality of velocity hypotheses;
selecting a velocity hypothesis for which the likelihood function has a maximum value; and
operating the vehicle using the selected velocity hypothesis.

2. The method of claim 1, further comprising obtaining a product of the reflected signal and the source signal, performing a low pass filter on the product, and sampling the filtered signal to obtain a sampled signal having the phase with non-linear terms.

3. The method of claim 1, wherein the phase is further non-linear in at least one of: (i) a chirp index; and (ii) a combination of the chirp index and the sample index.

4. The method of claim 1, further comprising selecting the velocity hypothesis for which the likelihood function has a global maximum value.

5. The method of claim 4, further comprising locating the global maximum value of the likelihood function by searching along one of a range and a velocity dimension of a likelihood grid during a first one-dimensional search and searching along the other of the range and velocity dimension during a second one-dimensional search.

6. The method of claim 1, further comprising navigating the vehicle with respect to the object based on the selected velocity hypotheses.

7. A radar system for a vehicle, comprising:
- a transmitter configured to transmit a source signal into a region proximate the vehicle;
- a receiver receptive to a reflected signal formed by reflection of the source signal from an object in the region; and
- a processor configured to:
  - sample the reflected signal at a sampling interval to obtain a plurality of velocity hypotheses, each velocity hypothesis having a phase that is non-linear in at least a sample index of the sampling interval;
  - determine a likelihood function for the plurality of velocity hypotheses;
  - select a velocity hypothesis for which the likelihood function has a maximum value; and
  - operate the vehicle using the selected velocity hypothesis.

8. The radar system of claim 7, wherein the processor is further configured to obtain a product of the reflected signal and the source signal, perform a low pass filter on the product, and sample the filtered signal to obtain a sampled signal having the phase with non-linear terms.

9. The radar system of claim 7, wherein the phase is further non-linear in at least one of: (i) a chirp index; and (ii) a combination of the chirp index and the sample index.

10. The radar system of claim 7, wherein the processor is further configured to select the velocity hypothesis for which the likelihood function has a global maximum value.

11. The radar system of claim 10, wherein the processor is further configured to locate the global maximum value of the likelihood function by searching along one of a range and a velocity dimension of a likelihood grid during a first one-dimensional search and searching along the other of the range and velocity dimension during a second one-dimensional search.

12. The radar system of claim 7, wherein the processor is further configured to navigate the vehicle with respect to the object based on the selected velocity hypotheses.

13. A vehicle, comprising:
- a transmitter configured to transmit a source signal into a region proximate the vehicle;
- a receiver receptive to a reflected signal formed by reflection of the source signal from an object in the region;
- a processor configured to:
  - sample the reflected signal at a sampling interval to obtain a plurality of velocity hypotheses, each velocity hypothesis having a phase that is non-linear in at least a sample index of the sampling interval;
  - determine a likelihood function for the plurality of velocity hypotheses; and
  - select a velocity hypothesis for which the likelihood function has a maximum value;
- a navigation system configured to navigate the vehicle with respect to the object using the selected velocity hypothesis.

14. The vehicle of claim 13, wherein the processor is further configured to obtain a product of the reflected signal and the source signal, perform a low pass filter on the product, and sample the filtered signal to obtain a sampled signal having the phase with non-linear terms.

15. The vehicle of claim 13, wherein the phase is further non-linear in at least one of: (i) a chirp index; and (ii) a combination of the chirp index and the sample index.

16. The vehicle of claim 13, wherein the processor is further configured to select the velocity hypothesis for which the likelihood function has a global maximum value.

17. The vehicle of claim 16, wherein the processor is further configured to locate the global maximum value of the likelihood function by searching along one of a range and a velocity dimension of a likelihood grid during a first one-dimensional search and searching along the other of the range and velocity dimension during a second one-dimensional search.

* * * * *